US006948010B2

(12) United States Patent
Somers et al.

(10) Patent No.: US 6,948,010 B2
(45) Date of Patent: Sep. 20, 2005

(54) METHOD AND APPARATUS FOR EFFICIENTLY MOVING PORTIONS OF A MEMORY BLOCK

(75) Inventors: Jeffrey Somers, Northboro, MA (US); Andrew Alden, Leominster, MA (US); John Edwards, Clinton, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 462 days.

(21) Appl. No.: 09/742,989

(22) Filed: Dec. 20, 2000

(65) Prior Publication Data

US 2002/0116555 A1 Aug. 22, 2002

(51) Int. Cl.⁷ .............................................. G06F 13/28
(52) U.S. Cl. ............................ 710/23; 710/3; 710/10; 710/22; 710/26; 710/37; 710/56; 711/121; 711/147; 370/389
(58) Field of Search .............................. 710/3, 10, 22, 710/23, 26, 37, 56; 711/121, 147; 370/389

(56) References Cited

U.S. PATENT DOCUMENTS

| | | | |
|---|---|---|---|
| 3,469,239 A | 9/1969 | Richmond et al. | 340/172.5 |
| 3,469,241 A | 9/1969 | Barton et al. | 340/172.5 |
| 3,544,973 A | 12/1970 | Borck, Jr. et al. | 340/172.5 |
| 3,548,382 A | 12/1970 | Lichty et al. | 340/172.5 |
| 3,609,704 A | 9/1971 | Shurter | 340/172.5 |
| 3,641,505 A | 2/1972 | Artz et al. | 340/172.5 |
| 3,705,388 A | 12/1972 | Nishimoto | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 253/153 |
| 3,820,079 A | 6/1974 | Bergh et al. | 340/172.5 |
| 3,840,861 A | 10/1974 | Amdahl et al. | 340/172.5 |
| 3,893,084 A | 7/1975 | Kotok et al. | 340/172.5 |
| 3,997,896 A | 12/1976 | Cassarino, Jr. et al. | 340/172.5 |
| 4,015,246 A | 3/1977 | Hopkins, Jr. et al. | 340/172.5 |
| 4,032,893 A | 6/1977 | Moran | 340/166 |
| 4,040,034 A | 8/1977 | Belady et al. | 364/200 |
| 4,059,736 A | 11/1977 | Perucca et al. | 179/175.2 |
| 4,096,572 A | 6/1978 | Namimoto | 364/200 |
| 4,164,787 A | 8/1979 | Aranguren | 364/200 |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |

(Continued)

FOREIGN PATENT DOCUMENTS

| | | | |
|---|---|---|---|
| EP | 0 208 430 | 1/1987 | 13/32 |
| EP | 0301499 | 1/1987 | |
| EP | 0428330 A3 | 11/1989 | |
| EP | 0 390 567 B1 | 10/1990 | 29/6 |
| EP | 0 406 759 A3 | 1/1991 | 12/56 |
| EP | 0 475 005 B1 | 3/1992 | 15/16 |
| EP | 0475005 B1 | 11/1995 | |
| EP | 0293860 B1 | 2/1996 | |
| EP | 0390567 B1 | 9/1999 | |
| GB | 2060229 A | 10/1979 | |

*Primary Examiner*—Jeffrey Gaffin
*Assistant Examiner*—Niketa Patel
(74) *Attorney, Agent, or Firm*—Kirkpatrick & Lockhart Nicholson Graham LLP

(57) ABSTRACT

The present invention relates to a method and system for transferring portions of a memory block. A first data mover is configured with a first start address corresponding to a first portion of a source memory block. A second data mover is configured with a second start address corresponding to a second portion of the source memory block sized differently from the first portion. The first portion of the source memory block is transferred by the first data mover and the second portion of the source memory block is transferred by the second data mover.

27 Claims, 6 Drawing Sheets

U.S. PATENT DOCUMENTS

| | | | |
|---|---|---|---|
| 4,296,463 A | 10/1981 | Dalboussiere et al. ....... | 364/200 |
| 4,309,754 A | 1/1982 | Dinwiddie, Jr. ............. | 364/200 |
| 4,356,550 A | 10/1982 | Katzman et al. ............. | 364/200 |
| 4,365,295 A | 12/1982 | Katzman et al. ............. | 364/200 |
| 4,366,535 A | 12/1982 | Cedolin et al. ............. | 364/200 |
| 4,369,494 A | 1/1983 | Bienvenu et al. ........... | 364/200 |
| 4,434,463 A | 2/1984 | Quinquis et al. ........... | 364/200 |
| 4,449,182 A | 5/1984 | Rubinson et al. ........... | 364/200 |
| 4,453,215 A | 6/1984 | Reid ....................... | 364/200 |
| 4,466,098 A | 8/1984 | Southard .................. | 371/9 |
| 4,467,436 A | 8/1984 | Chance et al. ............. | 364/513 |
| 4,484,273 A | 11/1984 | Stiffler et al. ............ | 364/200 |
| 4,486,826 A | 12/1984 | Wolff et al. .............. | 364/200 |
| 4,493,036 A | 1/1985 | Boudreau et al. ........... | 364/200 |
| 4,503,496 A | 3/1985 | Holzner et al. ............ | 364/200 |
| 4,503,499 A | 3/1985 | Mason et al. .............. | 364/200 |
| 4,543,628 A | 9/1985 | Pomfret ................... | 354/200 |
| 4,574,348 A | 3/1986 | Scallon ................... | 364/200 |
| 4,590,554 A | 5/1986 | Glazer et al. ............. | 364/200 |
| 4,597,084 A | 6/1986 | Dynneson et al. ........... | 371/21 |
| 4,608,631 A | 8/1986 | Stiffler et al. ........... | 364/200 |
| 4,608,688 A | 8/1986 | Hansen et al. ............. | 371/11 |
| 4,628,447 A | 12/1986 | Cartret et al. ............ | 364/200 |
| 4,630,193 A | 12/1986 | Kris ....................... | 364/200 |
| 4,633,394 A | 12/1986 | Georgiou et al. ........... | 364/200 |
| 4,637,024 A | 1/1987 | Dixon et al. .............. | 371/67 |
| 4,654,857 A | 3/1987 | Samson et al. ............. | 371/68 |
| 4,669,056 A | 5/1987 | Waldecker et al. .......... | 364/900 |
| 4,669,079 A | 5/1987 | Blum ...................... | 370/85 |
| 4,672,613 A | 6/1987 | Foxworthy et al. .......... | 371/38 |
| 4,674,037 A | 6/1987 | Funabashi et al. .......... | 364/200 |
| 4,677,546 A | 6/1987 | Freeman et al. ............ | 364/200 |
| 4,695,975 A | 9/1987 | Bedrij .................... | 364/900 |
| 4,700,292 A | 10/1987 | Campanini ................. | 364/200 |
| 4,703,420 A | 10/1987 | Irwin ..................... | 364/200 |
| 4,716,523 A | 12/1987 | Burrus, Jr. et al. ........ | 364/200 |
| 4,719,568 A | 1/1988 | Carrubba et al. ........... | 364/200 |
| 4,750,177 A | 6/1988 | Hendrie et al. ............ | 371/32 |
| 4,774,659 A | 9/1988 | Smith et al. .............. | 364/200 |
| 4,805,091 A | 2/1989 | Thiel et al. .............. | 364/200 |
| 4,809,169 A | 2/1989 | Sfarti et al. ............. | 364/200 |
| 4,816,990 A | 3/1989 | Williams .................. | 364/200 |
| 4,827,409 A | 5/1989 | Dickson ................... | 364/200 |
| 4,866,604 A | 9/1989 | Reid ...................... | 364/200 |
| 4,914,580 A | 4/1990 | Jensen et al. ............. | 364/200 |
| 4,916,695 A | 4/1990 | Ossfeldt .................. | 371/9.1 |
| 4,924,427 A | 5/1990 | Savage et al. ............. | 364/900 |
| 4,931,922 A | 6/1990 | Baty et al. ............... | 364/200 |
| 4,939,643 A | 7/1990 | Long et al. ............... | 364/200 |
| 4,942,517 A | 7/1990 | Cok ....................... | 364/200 |
| 4,942,519 A | 7/1990 | Nakayama .................. | 364/200 |
| 4,965,717 A | 10/1990 | Cutts, Jr. et al. ......... | 364/200 |
| 4,974,144 A | 11/1990 | Long et al. ............... | 364/200 |
| 4,974,150 A | 11/1990 | Long et al. ............... | 364/200 |
| 4,985,830 A | 1/1991 | Atac et al. ............... | 364/200 |
| 4,993,030 A | 2/1991 | Krakauer et al. ........... | 371/40.1 |
| 4,994,960 A | 2/1991 | Tuchler et al. ............ | 364/200 |
| 5,083,258 A | 1/1992 | Yamasaki .................. | 395/725 |
| 5,115,490 A | 5/1992 | Komuro et al. ............. | 395/400 |
| 5,117,486 A | 5/1992 | Clark et al. .............. | 395/250 |
| 5,138,257 A | 8/1992 | Katsura ................... | 324/158 |
| 5,175,855 A | 12/1992 | Putnam et al. ............. | 395/700 |
| 5,179,663 A | 1/1993 | Iimura .................... | 395/250 |
| 5,193,162 A | 3/1993 | Bordsen et al. ............ | 395/425 |
| 5,193,180 A | 3/1993 | Hastings .................. | 395/575 |
| 5,195,040 A | 3/1993 | Goldsmith ................. | 364/443 |
| 5,231,640 A | 7/1993 | Hanson et al. ............. | 371/68.3 |
| 5,247,522 A | 9/1993 | Reiff ..................... | 371/29.5 |
| 5,251,303 A | 10/1993 | Fogg, Jr. et al. .......... | 395/275 |
| 5,270,699 A | 12/1993 | Signaigo et al. ........... | 340/825.01 |
| 5,276,860 A | 1/1994 | Fortier et al. ............ | 395/575 |
| 5,280,587 A * | 1/1994 | Shimodaira et al. ......... | 713/600 |
| 5,280,612 A | 1/1994 | Lorie et al. .............. | 395/600 |
| 5,280,619 A | 1/1994 | Wang ...................... | 395/725 |
| 5,283,870 A | 2/1994 | Joyce et al. .............. | 395/200 |
| 5,295,258 A | 3/1994 | Jewett et al. ............. | 395/575 |
| 5,313,627 A | 5/1994 | Amini et al. .............. | 395/575 |
| 5,317,726 A | 5/1994 | Horst ..................... | 395/575 |
| 5,321,706 A | 6/1994 | Holm et al. ............... | 371/51.1 |
| 5,335,334 A | 8/1994 | Takahashi et al. .......... | 395/425 |
| 5,357,612 A | 10/1994 | Alaiwan ................... | 395/200 |
| 5,371,885 A | 12/1994 | Letwin .................... | 395/600 |
| 5,386,524 A | 1/1995 | Lary et al. ............... | 395/400 |
| 5,388,242 A | 2/1995 | Jewett .................... | 395/425 |
| 5,404,361 A | 4/1995 | Casorso et al. ............ | 371/40.1 |
| 5,423,037 A | 6/1995 | Hvasshovd ................. | 395/600 |
| 5,423,046 A | 6/1995 | Nunnelley et al. .......... | 395/750 |
| 5,426,747 A | 6/1995 | Weinreb et al. ............ | 395/400 |
| 5,428,766 A | 6/1995 | Seaman .................... | 395/575 |
| 5,440,710 A | 8/1995 | Richter et al. ............ | 395/417 |
| 5,440,727 A | 8/1995 | Bhide et al. .............. | 395/444 |
| 5,440,732 A | 8/1995 | Lomet et al. .............. | 395/600 |
| 5,454,091 A | 9/1995 | Sites et al. .............. | 395/413 |
| 5,463,755 A | 10/1995 | Dumarot et al. ............ | 395/475 |
| 5,465,328 A | 11/1995 | Dievendorff et al. ........ | 395/182.13 |
| 5,465,340 A | 11/1995 | Creedon et al. ............ | 395/846 |
| 5,475,860 A | 12/1995 | Ellison et al. ............ | 395/846 |
| 5,497,476 A | 3/1996 | Oldfield et al. ........... | 395/439 |
| 5,504,873 A | 4/1996 | Martin et al. ............. | 395/438 |
| 5,513,314 A | 4/1996 | Kandasamy et al. .......... | 395/182.04 |
| 5,537,535 A | 7/1996 | Maruyama et al. ........... | 395/183.01 |
| 5,550,986 A | 8/1996 | DuLac ..................... | 395/280 |
| 5,551,020 A | 8/1996 | Flax et al. ............... | 395/600 |
| 5,555,372 A | 9/1996 | Tetreault et al. .......... | 396/185.01 |
| 5,555,404 A | 9/1996 | Torbjørnsen et al. ........ | 395/600 |
| 5,557,770 A | 9/1996 | Bhide et al. .............. | 295/488 |
| 5,566,316 A | 10/1996 | Fechner et al. ............ | 395/441 |
| 5,568,629 A | 10/1996 | Gentry et al. ............. | 395/441 |
| 5,574,865 A | 11/1996 | Hashemi ................... | 395/283 |
| 5,581,750 A | 12/1996 | Haderle et al. ............ | 395/618 |
| 5,584,008 A | 12/1996 | Shinada et al. ............ | 395/441 |
| 5,584,018 A | 12/1996 | Kamiyama .................. | 395/492 |
| 5,584,030 A | 12/1996 | Husak et al. .............. | 395/750 |
| 5,586,253 A | 12/1996 | Green et al. .............. | 395/411 |
| 5,586,310 A | 12/1996 | Sharman ................... | 395/600 |
| 5,600,784 A | 2/1997 | Bissett et al. ............ | 395/182.1 |
| 5,606,681 A | 2/1997 | Smith et al. .............. | 395/413 |
| 5,608,901 A | 3/1997 | Letwin .................... | 395/621 |
| 5,613,162 A | 3/1997 | Kabenjian ................. | 395/842 |
| 5,619,671 A | 4/1997 | Bryant et al. ............. | 395/412 |
| 5,627,961 A | 5/1997 | Sharman ................... | 395/182.04 |
| 5,627,965 A | 5/1997 | Liddell et al. ............ | 395/185.01 |
| 5,628,023 A | 5/1997 | Bryant et al. ............. | 395/800 |
| 5,630,056 A | 5/1997 | Horvath et al. ............ | 395/185.09 |
| 5,632,031 A | 5/1997 | Velissaropoulos et al. .... | 395/611 |
| 5,651,139 A | 7/1997 | Cripe et al. .............. | 395/490 |
| 5,659,681 A | 8/1997 | Ojima ..................... | 395/183.19 |
| 5,664,172 A | 9/1997 | Antoshenkov .............. | 395/604 |
| 5,671,443 A | 9/1997 | Stauffer et al. ........... | 391/810 |
| 5,682,513 A | 10/1997 | Candelaria et al. ......... | 395/440 |
| 5,696,905 A | 12/1997 | Reimer et al. ............. | 395/227 |
| 5,701,410 A | 12/1997 | BeMent et al. ............. | 395/183 |
| 5,701,457 A | 12/1997 | Fujiwara .................. | 395/608 |
| 5,724,581 A | 3/1998 | Kozakura .................. | 395/618 |
| 5,737,601 A | 4/1998 | Jain et al. ............... | 395/617 |
| 5,742,792 A | 4/1998 | Yanai et al. .............. | 395/489 |
| 5,745,913 A | 4/1998 | Pattin et al. ............. | 711/105 |
| 5,751,955 A | 5/1998 | Sonnier et al. ............ | 395/200 |
| 5,754,821 A | 5/1998 | Cripe et al. .............. | 395/491 |
| 5,758,065 A | 5/1998 | Reams et al. .............. | 395/185.01 |
| 5,784,699 A | 7/1998 | McMahon et al. ............ | 711/171 |

| | | | |
|---|---|---|---|
| 5,794,035 A | 8/1998 | Golub et al. | 395/674 |
| 5,805,842 A * | 9/1998 | Nagaraj et al. | 710/313 |
| 5,809,256 A | 9/1998 | Najemy | 395/283 |
| 5,812,748 A | 9/1998 | Ohran et al. | 395/182.02 |
| 5,815,647 A | 9/1998 | Buckland et al. | 395/185.09 |
| 5,815,649 A | 9/1998 | Utter et al. | 395/112.04 |
| 5,828,903 A | 10/1998 | Sethuram et al. | 751/340 |
| 5,838,894 A | 11/1998 | Horst | 395/182.09 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,850,632 A | 12/1998 | Robertson | 711/170 |
| 5,860,126 A | 1/1999 | Mittal | 711/167 |
| 5,862,145 A | 1/1999 | Grossman et al. | 371/5.1 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,892,928 A | 4/1999 | Wallach et al. | 395/283 |
| 5,915,107 A | 6/1999 | Maley et al. | 395/551 |
| 5,920,898 A | 7/1999 | Bolyn et al. | 711/167 |
| 5,928,339 A | 7/1999 | Nishikawa | 710/26 |
| 5,944,800 A | 8/1999 | Mattheis et al. | 710/23 |
| 5,956,476 A | 9/1999 | Ranson et al. | 395/183.06 |
| 5,959,923 A | 9/1999 | Matteson et al. | 365/222 |
| 5,960,459 A | 9/1999 | Thome et al. | 711/154 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |
| 5,987,620 A | 11/1999 | Tran | 713/600 |
| 5,991,900 A | 11/1999 | Garnett | 395/183.19 |
| 5,996,035 A | 11/1999 | Allen et al. | 710/103 |
| 6,000,007 A | 12/1999 | Leung et al. | 711/105 |
| 6,000,043 A | 12/1999 | Abramson | 395/183.2 |
| 6,009,481 A | 12/1999 | Mayer | 710/33 |
| 6,012,109 A * | 1/2000 | Schultz | 710/56 |
| 6,016,495 A | 1/2000 | McKeehan et al. | 707/103 |
| 6,021,456 A | 2/2000 | Herdeg et al. | 710/260 |
| 6,026,458 A | 2/2000 | Rasums | 710/103 |
| 6,026,465 A | 2/2000 | Mills et al. | 711/103 |
| 6,026,475 A | 2/2000 | Woodman | 711/202 |
| 6,032,271 A | 2/2000 | Goodrum et al. | 714/56 |
| 6,047,343 A | 4/2000 | Olarig | 719/102 |
| 6,049,894 A | 4/2000 | Gates | 714/41 |
| 6,052,743 A * | 4/2000 | Schwan et al. | 710/23 |
| 6,055,584 A | 4/2000 | Bridges et al. | 710/27 |
| 6,055,617 A | 4/2000 | Kingsbury | 711/203 |
| 6,062,480 A | 5/2000 | Evoy | 235/492 |
| 6,065,017 A | 5/2000 | Barker | 707/202 |
| 6,067,550 A | 5/2000 | Lomet | 707/202 |
| 6,067,608 A | 5/2000 | Perry | 711/203 |
| 6,073,196 A | 6/2000 | Goodrum et al. | 710/103 |
| 6,081,854 A * | 6/2000 | Priem et al. | 710/37 |
| 6,085,296 A | 7/2000 | Karkhanis et al. | 711/147 |
| 6,105,075 A | 8/2000 | Ghaffari | 710/5 |
| 6,119,128 A | 9/2000 | Courter et al. | 707/202 |
| 6,119,214 A | 9/2000 | Dirks | 711/206 |
| 6,125,417 A | 9/2000 | Bailis et al. | 710/103 |
| 6,128,713 A | 10/2000 | Eisler et al. | 711/159 |
| 6,134,638 A | 10/2000 | Olarig et al. | 711/167 |
| 6,138,198 A | 10/2000 | Garnett et al. | 710/129 |
| 6,141,722 A | 10/2000 | Parsons | 711/2 |
| 6,141,744 A | 10/2000 | So | 712/35 |
| 6,145,027 A * | 11/2000 | Seshan et al. | 710/22 |
| 6,195,730 B1 * | 2/2001 | West | 711/121 |
| 6,209,042 B1 * | 3/2001 | Yanagisawa et al. | 710/3 |
| 6,373,841 B1 * | 4/2002 | Goh et al. | 370/389 |
| 6,412,027 B1 * | 6/2002 | Amrany et al. | 710/22 |
| 6,453,365 B1 * | 9/2002 | Habot | 710/22 |
| 6,457,073 B2 * | 9/2002 | Barry et al. | 710/22 |
| 6,493,803 B1 * | 12/2002 | Pham et al. | 711/147 |
| 6,557,052 B1 * | 4/2003 | Kubo | 710/23 |
| 6,747,984 B1 * | 6/2004 | Hoglund et al. | 370/428 |

* cited by examiner

METHOD AND APPARATUS FOR EFFICIENTLY MOVING PORTIONS OF A MEMORY BLOCK

FIELD OF THE INVENTION

The present invention relates generally to computer memory and more specifically to transferring portions of a computer memory block.

BACKGROUND OF THE INVENTION

Transmitting data from one component of a computer system to a second component of a computer system is typically an important aspect in the execution of tasks. If the data needed by the first component of a system resides on the second component and is of a substantial size, the system resources, such as the Central Processing Unit (CPU), are "tied up" (i.e., unavailable) for the period of time required to move the data. The unavailable time is often burdensome to the execution of tasks and can sometimes be critical to the performance of the computer system.

To transfer data efficiently, computer systems typically employ a Direct Memory Access (DMA) controller to transfer data from a source location to a target location without the intervention of the CPU. Further, a computer system may have multiple DMA controllers that each operate independently to transfer data between multiple I/O devices and memory. The multiple DMA controllers generally transfer blocks of data having a specific size and at a particular transfer rate.

However, the multiple DMA controllers can still generally be inefficient when transferring blocks of data at a particular transfer rate. First, transferring data of a particular size between one I/O device and memory at a particular transfer rate can be inefficient in that the data can have a substantial size and consequently slow the operations of the computer system.

Additionally, one DMA controller transfers data having the specific size between a particular block of memory and an I/O device. Moreover, when the data block has a size that is large enough to require multiple DMA transactions, the time to complete the transaction is increased.

SUMMARY OF THE INVENTION

The present invention relates to a method and system for transferring portions of a memory block. In one aspect, the method includes the steps of configuring a first data mover (DM) with a first start address corresponding to a first portion of a source memory block and configuring a second DM with a second start address corresponding to a second portion of the source memory block sized differently from the first portion. The method also includes the steps of transferring the first portion of the source memory block by the first DM and transferring the second portion of the source memory block by the second DM. In one embodiment, the method also includes configuring the first DM with a first end address corresponding to the first portion of the source memory block and configuring the second DM with a second end address corresponding to the second portion of the source memory block.

In another aspect, the system includes a first DM and a second DM in communication with the first DM over a DM communications bus. The system also includes a first memory component having a first portion and a second portion sized differently from the first portion. The first memory component is in communication with the first DM and the second DM over a first DM-memory bus. The system additionally includes a second memory component in communication with the first DM and the second DM over a second DM-memory bus. The first DM transfers the first memory portion to the second memory component over the first DM-memory bus at a first data transfer rate and the second DM transfers the second memory portion to the second memory component over the second DM-memory bus at a second data transfer rate.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1:
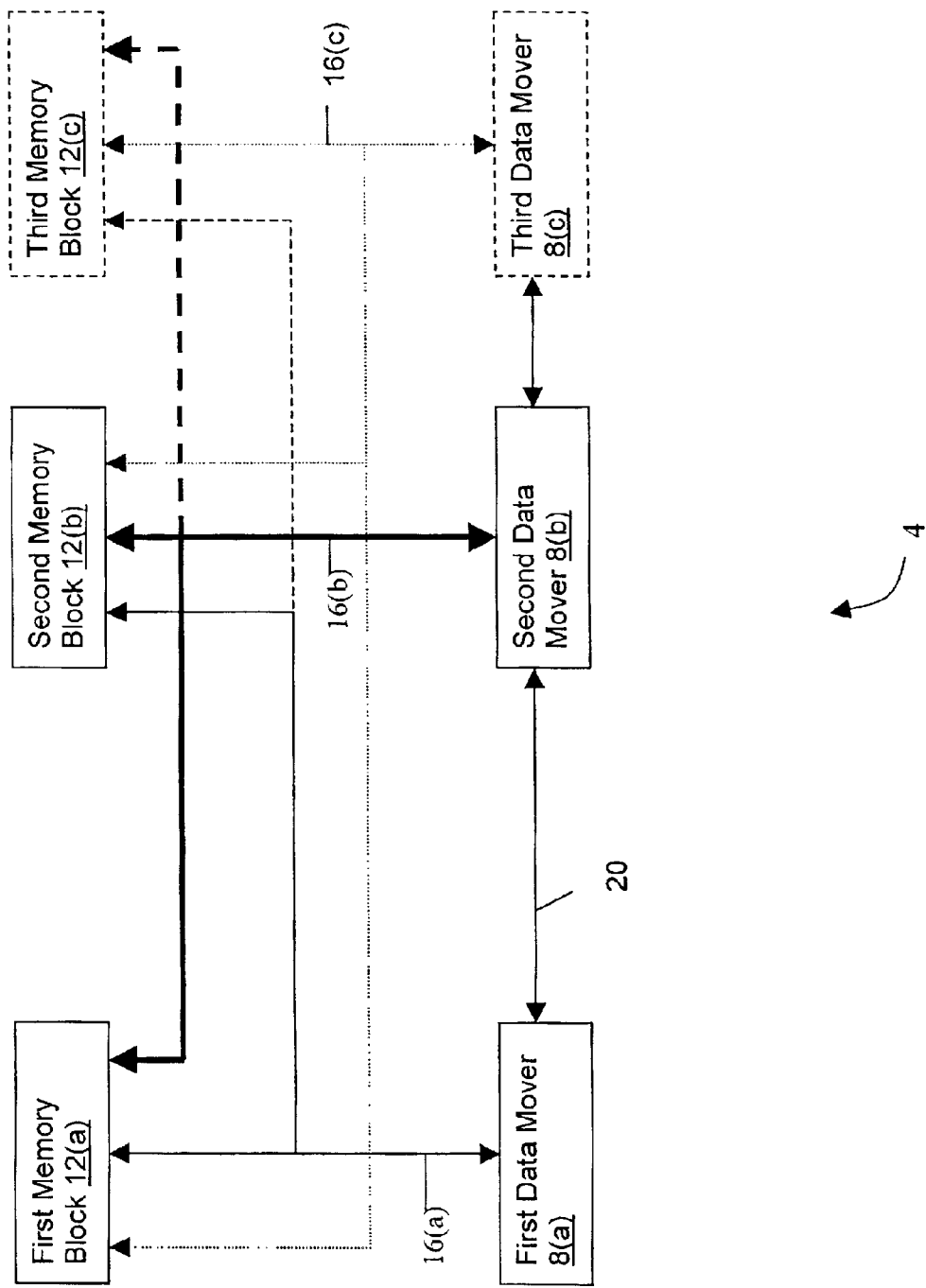
FIG. 1 is a block diagram of an embodiment of a computer system constructed in accordance with the invention.

FIG. 1 depicts an embodiment of a computer system 4 that includes a first data mover (DM) 8(a) and a second DM 8(b) (generally 8). The first DM 8(a) communicates with a first memory block 12(a), or source memory block, and a second memory block 12(b), or target memory block, (generally 12) over a first DM-memory bus 16(a). The second DM 8(b) communicates with the memory blocks 12, or memory components, over a second DM-memory bus 16(b). Additionally, the first DM 8(a) communicates with the second DM 8(b) over a DM communications bus 20.

The DMs 8 substantially simultaneously transfer memory portions (not shown), or memory pages, having different sizes from the source memory block 12(a) to the target memory block 12(b). In one embodiment, the DMs 8 transfer the memory portions at different data transfer rates. In one embodiment, each DM 8 is a DMA engine, or DMA controller. As an example, a DMA controller could be used to copy data when an I/O device, such as a data logger, needs to save a large amount of data when some event occurs (e.g., the temperature of the system exceeds a predefined temperature). In a further embodiment, the DM 8 is a burst mode DMA, which transfers an entire block of memory to a specific destination. The burst mode DMA obtains exclusive access to the DM-memory bus 16 for the duration of the transfer. In yet another embodiment, the DM 8 is a flyby DMA, which executes a read and write cycle simultaneously. The flyby DMA reads data from the source address and writes the data to a target address concurrently. For example, a flyby DMA copies data from the source memory block 12(a) to a first-in first-out (FIFO) port. More specifically, the source address (i.e., a pointer to an address within the source memory block 16(a)) increments on each transfer, while the target address always refers to the same FIFO.

In one embodiment, the DMs 8 are located on an Application Specific Integrated Circuit (ASIC). Other examples of the location of the DMs 8 include, without limitation, a field-programmable gate array (FPGA), a programmable array logic (PAL), a programmable logic device (PLD), an Input/Output (I/O) board, a digital logic circuit, and the like.

To enable the transfer of memory portions at different data transfer rates, the first DM 8(a) may operate at a faster clock speed than the second DM 8(b). In another embodiment, to enable the transfer of memory portions at different data transfer rates, each DM-memory bus 16 transfers data at a different bandwidth relative to the bandwidth of the other DM-memory buses 16. For example, one of the DM-memory buses 16 may operate at 33 MHz while another DM-memory bus 16 operates at 66 MHz.

In one particular embodiment, one or all of the DM-memory buses 16 are a Peripheral Component Interconnect (PCI) bus, which is a local bus used for 8 bit or 64 bit computer system interfacing and was developed by Intel Corporation of Austin, Tex. Other examples of the DM-memory buses 16 include, without limitation, an Industry Standard Architecture (ISA) bus, an Extended ISA (EISA) bus, a Nu Bus developed by Apple of Cupertino, Calif., a MicroChannel Architecture (MCA) Bus developed by IBM Corporation of Armonk, N.Y., a Video Electronics Standards Association (VESA) bus, a VESA local (VL) bus, and the like. Additionally, the DM communications bus 20 is an internal bus to the computer system 4. In one embodiment, the DM communications bus 20 is an Inter-IC (I2C) bus, manufactured by Philips Semiconductors of New York, N.Y.

The source memory block 12(a) can be volatile memory components or non-volatile memory components. The target memory block 12(b) is typically volatile memory components. Examples of the volatile memory blocks 12 include, without limitation, Random Access Memory (RAM), Static RAM (SRAM), and Dynamic RAM (DRAM). Examples of non-volatile memory blocks 12 include, without limitation, Read Only Memory (ROM), Programmable ROM (PROM), Erasable Programmable ROM (EPROM), and the like. The first memory portion and the second memory portion of each memory block 12 has a start address and an end address and can be mapped to contiguous or non-contiguous addresses.

In another embodiment, the computer system 4 includes a third DM 8(c) (shown in phantom) in communication with a third memory block 12(c) (shown in phantom). The third DM 8(c) communicates with the third memory block 12(c) over a third DM-memory bus 16(c). Although the computer system 4 depicted in FIG. 1 has three DMs 8 and three memory blocks 12, any number of DMs 8 and/or memory blocks 12 may be included in the computer system 4.

Figure 2:
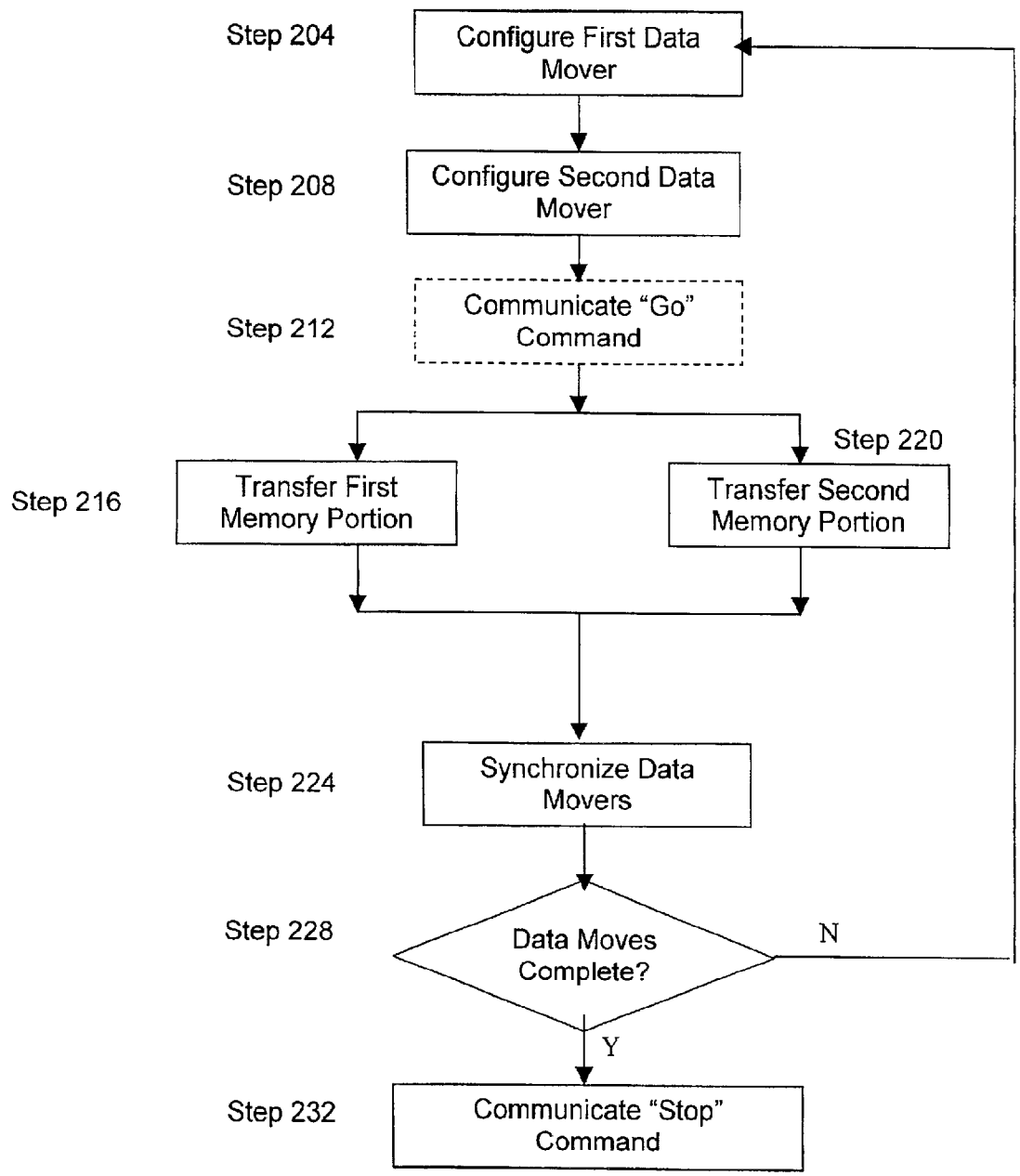
FIG. 2 is a flow chart depicting the operation of an embodiment of the present invention.

A flow chart depicting the operation of an embodiment of the DM 8 is shown in FIG. 2. The first DM 8(a) is configured (step 204) with a first start address corresponding to the first memory portion of the source memory block 12(a) to be moved. In one embodiment, the first DM 8 is configured to be a master DM 8. The master DM 8(a) is a DM 8 that initiates a data move and communicates to the other DMs 8 (e.g., second DM 8(b)), also called slave DMs, to start the data move. The master DM 8(a) also communicates additional information to the slave DMs 8(b), such as the addresses of the memory portions that each slave DM 8(b) moves. In a further embodiment, the master DM 8(a) is configured with an end address for the data move.

The second DM 8(b) is configured (step 208) with a second start address corresponding to the second memory portion of the source memory block 12(a) to be moved. More specifically, the master DM 8(a) communicates the second start address to the slave DM 8(b) over the DM communications bus 20. The communication of a start address to the slave DM 8(b) starts the data move operation. In a further embodiment, the master DM 8(a) communicates a next address (as the second start address) and an offset address corresponding to the second memory portion. The slave DM 8 combines the next address with the offset address to obtain a particular start address for the respective move by that DM 8. In one embodiment, the second memory portion is sized differently from the first memory portion.

In another embodiment, the master DM 8(a) communicates (step 212) a "go" command to the DMs 8 to start the data move operation. In further embodiments, the master DM 8 starts a counter when transmitting the "go" command to enable synchronization of the DMs 8. The counter is reset each time all of the DMs 8 complete the move of their assigned memory portion of the source memory block 12(a).

The master DM 8(a) then transfers (step 216) the first memory portion of the source memory block 12(a) to the first memory portion of the target memory block 12(b) and the slave DM 8(b) transfers (step 220) the second memory portion of the source memory block 12(a) to the second memory portion of the target memory block 12(b).

The master DM 8(a) and the slave DM 8(b) then synchronize (step 224) their activity before performing the next data move. In one embodiment, each slave DM 8(b) communicates a message over the DM communications bus 20 to the master DM 8(a) after completing their respective data move operation. For example, the DMs 8(b) output a low value on a particular line on the DM communications bus 20 after completing their respective data move operation. In another embodiment, each DM 8 checks the counter that the master DM 8(a) started upon communication of the "go" command to ensure that all DMs 8 have completed the data move of their respective memory portions. By checking the counter, the DMs 8 synchronize so that the DMs 8 transfer data substantially simultaneously (i.e., no DM 8 starts to move the next memory portion until the other DMs 8 complete the current data move). Additionally, the DM 8 reads a Blocked Boundary Window (BBW) to ensure that an I/O device is not substantially simultaneously transferring data to the same memory portion that a DM 8 is reading from during a data move operation.

Next, the master DM 8(a) determines (step 228) if the data move for the entire source memory block 12(a) is complete. For example and in one embodiment, the master DM 8(a) determines that the data move is complete when the next address is greater than an end address. If the data move operation is not complete, the master DM 8(a) and the slave DM 8(b) are configured in steps 204 and 208 with different start addresses that corresponds to different memory portions of the source memory block 12(a) (i.e., to move memory portions that were not previously moved). The data move operation repeats itself with respect to these different memory portions until the master DM 8(a) determines that the data move is complete for the source memory block 12(*a*). Following this determination, the master DM 8(*a*) transmits (step 232) a "stop" command to the slave DMs 8 over the DM communications bus 20.

Figure 3:
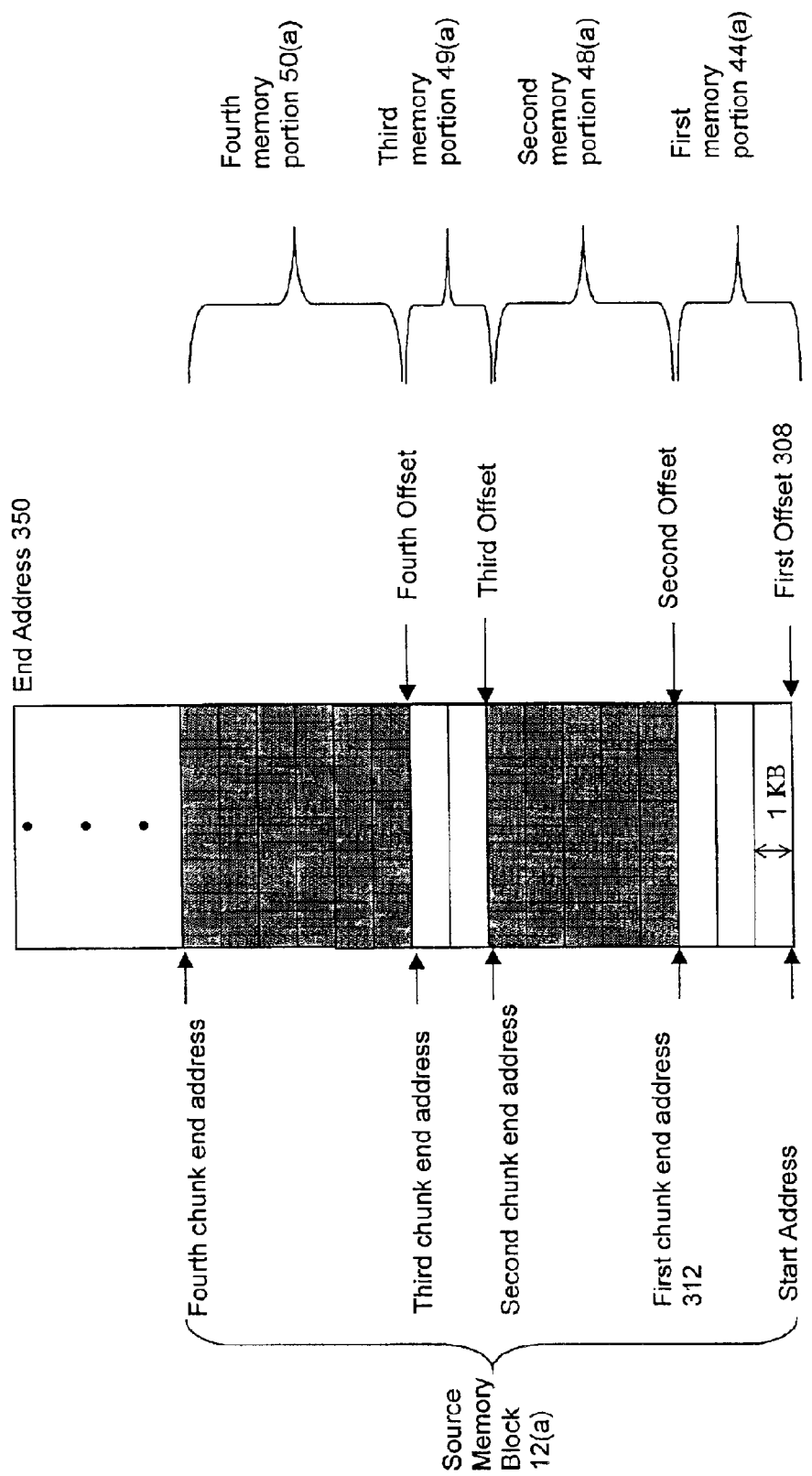
FIG. 3 is a block diagram of an exemplary embodiment of a memory component in accordance with the invention.

Referring to FIG. 3, each DM 8 moves the data in the source memory block 12(*a*) to another location (e.g., the target memory block 12(*b*)). In this exemplary embodiment, the source memory block 12(*a*) is subdivided into four distinct memory portions 44(*a*), 48(*a*), 49(*a*), 50(*a*), each having a different size (i.e., 3 kilobytes (KB), 5 KB, 2 KB, and 6 KB). In a further embodiment, the target memory block 12(*b*) has corresponding memory portions 44(*b*), 48(*b*), 49(*b*), and 50(*b*) (not shown).

Each memory portion 44(*a*), 48(*a*), 49(*a*), 50(*a*) is defined by the offset and a chunk end address. In one embodiment, the start address 304, which is shown to be the start of the source memory block 12(*a*), is substantially equivalent to the first offset 308. The first chunk end address 312 is the end address of the first memory portion 44(*a*). Although FIG. 3 shows the memory portions 44(*a*), 48(*a*), 49(*a*), and 50(*a*) having specific sizes, any sized memory portions 44(*a*), 48(*a*), 49(*a*), and 50(*a*) (i.e., different size or substantially equivalent size) can be moved by the DMs 8. As an example of a data move operation, the master DM 8(*a*) moves the first memory portion 44(*a*) of the source memory block 12(*a*) to the target memory block 12(*b*) and the slave DM 8(*b*) simultaneously moves the second memory portion 48(*a*) of the source memory block 12(*a*) to the target memory block 12(*b*) at a different data transfer rate. When the master DM 8(*a*) and the slave DM 8(*b*) complete this data move, the master DM 8(*a*) communicates with the slave DM 8(*b*) a second next address corresponding to the start of the next memory portion 44(*a*), 48(*a*), 49(*a*), 50(*a*) (e.g., the fourth memory portion 50(*a*)) to transfer by the slave DM 8(*b*). The DMs 8 continue to perform data moves until the next address is substantially greater than the end address 350.

Additionally, in other embodiments the DMs 8 move multiple memory portions 44(*a*), 48(*a*), 49(*a*), 50(*a*) in sequence in one data move. More specifically and for example, the start address 304 corresponds to the start of the source memory block 12(*a*) and the first chunk end address 312 corresponds to the end address of the third memory portion 49(*a*). The slave DM 8(*b*) moves the three memory portions 44(*a*), 48(*a*), 49(*a*) before the master DM 8(*a*) communicates a second next address to the slave DM 8(*b*). Therefore, each DM 8(*a*) can move any number of memory portions in any data move operation.

Figure 4:
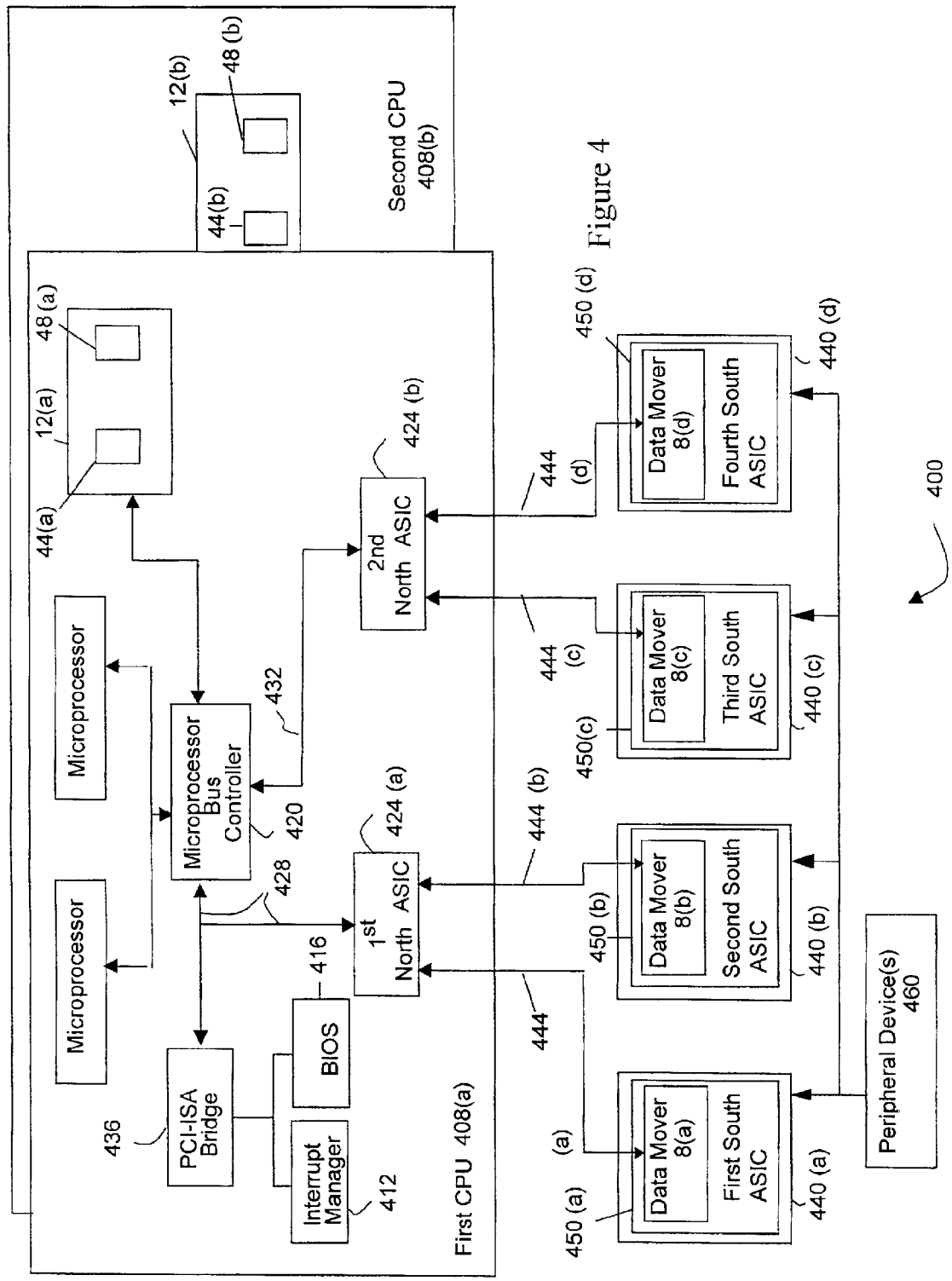
FIG. 4 is a block diagram of an embodiment of a fault-tolerant computer system constructed in accordance with the invention.

FIG. 4 depicts a fault-tolerant computer (FTC) system 400 in which the present invention may be used. The FTC system 400 includes a first CPU 408(*a*), or on-line CPU, and a second CPU 408(*b*), or off-line CPU (generally 408). Examples of the CPU 408 are, without limitation, a Pentium Classic/MMX CPU, developed by Intel Corporation of Austin, Tex., an AMD-K6 CPU, developed by AMD of Sunnyvale, Calif., and the like. The first CPU 408(*a*) includes the source memory block 12(*a*) and the second CPU 408(*b*) includes the target memory block 12(*b*). Each memory block 12 further includes the first memory portion 44(*a*), 44(*b*) (generally 44) and the second memory portion 48(*a*), 48(*b*) (generally 48). The CPUs 408 also include an interrupt manager 412, a basic I/O system (BIOS) 416, and a CPU bus controller 420. Additionally, the CPUs 408 include a first north ASIC 424(*a*) and a second north ASIC 424(*b*) (generally 424).

The FTC system 400 shown in FIG. 4 further includes a first I/O board 440(*a*), a second I/O board 440(*b*), a third I/O board 440(*c*), and a fourth I/O board 440(*d*) (generally 440), although a FTC system can generally include any number of I/O boards. The I/O boards 440 additionally include a respective south ASIC 450(*a*), 450(*b*), 450(*c*), 450(*d*) (generally 450). Each south ASIC 450 includes a DM 8. The FTC system also includes peripheral devices 460, such as a display screen, keyboard, printers, and disk drive.

The CPU bus controller 420 communicates with the CPUs 408, the first memory block 12(*a*), and the second memory block 12(*b*). Additionally, the CPU bus controller 420 communicates with a first north ASIC 424(*a*) and a second north ASIC 424(*b*) (generally 424). More specifically, the CPU bus controller 420 communicates with the first north ASIC 424(*a*) over a PCI bus 428 operating at 33 MHz and communicates with the second north ASIC 424(*b*) over an Accelerated Graphics Port (AGP) bus 432 (i.e., an enhanced PCI bus) operating at 66 MHz. In one embodiment, the CPU bus controller 420 is the 440GX, developed by Intel Corporation of Austin, Tex.

The interrupt manager 412 manages interrupts for the multiple CPUs 408(*a*), 408(*b*). More specifically, the interrupt manager 412 transmits a hardware-generated interrupt to the CPU 408 that is most able to service that specific interrupt. In one embodiment, the interrupt manager 412 is the I/O Advanced Programmable Interrupt Controller (APIC), developed by Intel Corporation of Austin, Tex.

The BIOS 416 is software that boots the CPUs 408 and determines what the CPUs 408 can execute without accessing a peripheral device 460. Further, the FTC system 400 (e.g., the CPUs 408) typically executes software that may be stored in non-volatile memory (i.e., ROM), which is described in greater detail below. The FTC system 400 can also have an OS. Examples of the OS include, but are not limited to, Windows NT developed by Microsoft Corporation of Redmond, Wash., OS/2 developed by IBM Corporation of Armonk, N.Y., Netware developed by Novell, Incorporated of San Jose, Calif., and the like.

The first north ASIC 424(*a*) communicates with a first I/O board 440(*a*) and a second I/O board 440(*b*) over a first and second PCI north-south bus 444(*a*), 444(*b*) (generally 444 (*ab*)), respectively. The second north ASIC 424(*b*) communicates with a third and fourth I/O board 440(*c*), 440(*d*), respectively, over a third and fourth PCI north-south bus 444(*c*), 444(*d*) (generally 444(*cd*)), respectively.

The first DM 8(*a*) and the second DM 8(*b*) connect to the PCI bus 428 with the PCI north-south bus 444(*ab*) while the third DM 8(*c*) and the fourth DM 8(*d*) connect to the AGP bus 432 with the PCI north-south bus 444(*cd*). The connection to buses 428, 432 that operate at different frequencies (i.e., 33 MHz and 66 MHz) enables the first and the second DMs 8(*a*), 8(*b*), respectively, to perform data moves at different data transfer rates. The peripheral devices 460 also communicate with the I/O boards 440.

As a further example, the FTC system 400 uses the DMs 8 to copy differently sized memory portions 44(*a*), 48(*a*) of the source memory block 12(*a*) of the on-line CPU 408(*a*) into the corresponding memory portions 44(*b*), 48(*b*) of the target memory block 12(*b*) of the off-line CPU 408(*b*) prior to synchronizing the two CPUs 408.

For simplicity of explanation and depiction, the following discussion assumes that the FTC system 400 includes several components (e.g., two CPUs 408, one CPU motherboard 404), although the invention may include any number of components.

Figure 5:
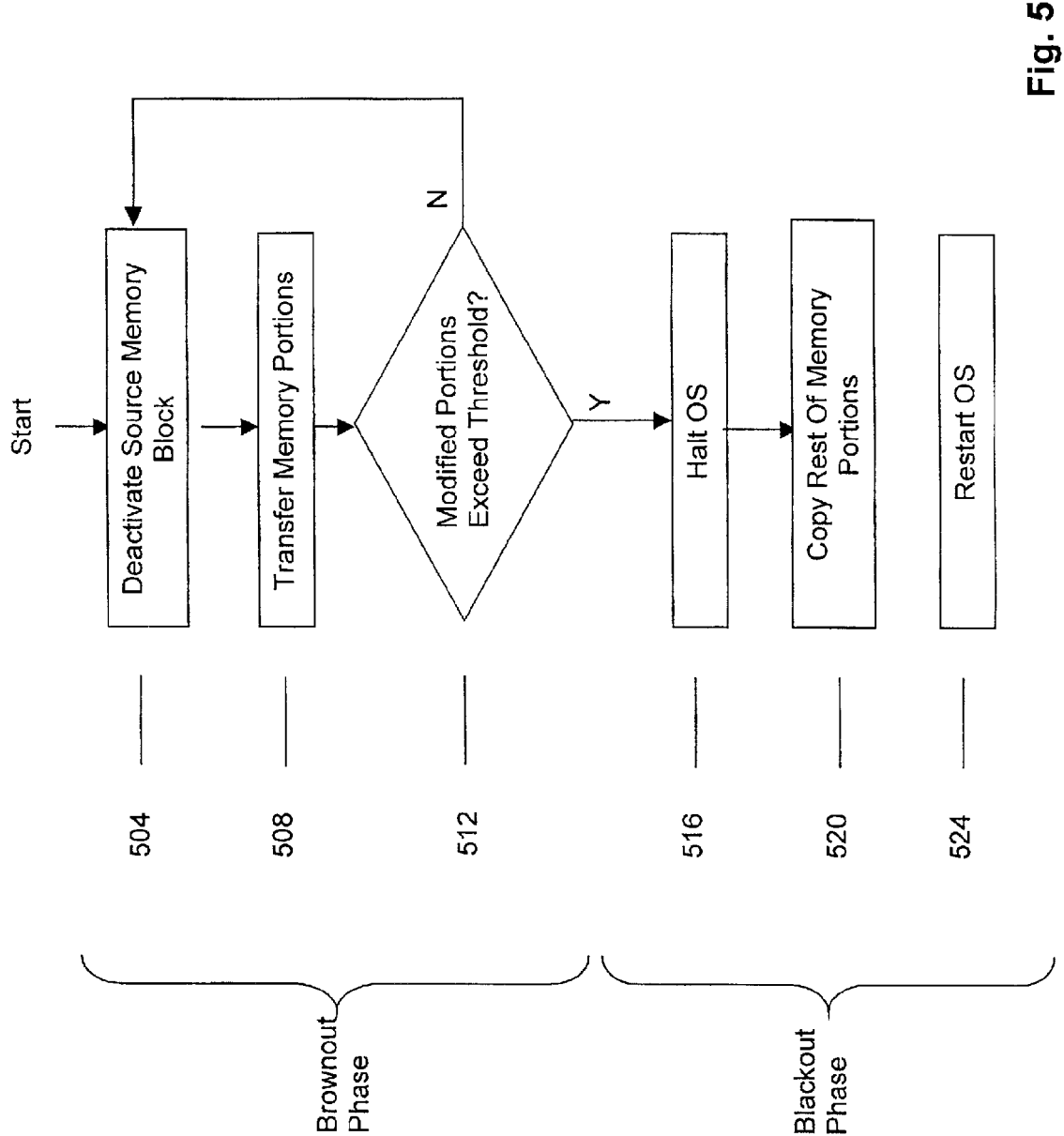
FIG. 5 is a flow chart illustrating an embodiment of the steps performed in the brownout phase and blackout phase by a fault-tolerant computer system in accordance with the invention.

In broad overview and also referring to FIG. 5, an exemplary flow diagram is shown denoting the steps that the FTC system 400 performs in a data move operation. In one embodiment, the FTC system 400 first deactivates (step 504) the source memory block 12(*a*) of the on-line CPU 408(*a*). The FTC system 400 then uses the DMs 8 to transfer (step 508) the memory portions (e.g., memory portion 44(*a*), 48(*a*)) of the source memory block 12(*a*) to the respective memory portions (e.g., memory portion 44(*b*), 48(*b*)) of the target memory block 12(*b*). In one embodiment, the address of each memory portion 44(*b*), 48(*b*) of the target memory block 12(*b*) of the off-line CPU 408(*b*) is equivalent to the address of the corresponding memory portion 44(*a*), 48(*a*) of the source memory block 12(*a*) of the on-line CPU 408(*a*).

Simultaneously, the OS can selectively reactivate and access the memory portions 44(*a*), 48(*a*) of the source memory block 12(*a*) of the on-line CPU 408(*a*). More specifically, the OS can modify the memory portions 44(*a*), 48(*a*) of the source memory block 12(*a*). In one embodiment, the OS tracks (e.g., stores) the modified memory portions 44(*a*), 48(*a*).

After a certain time period, the FTC system 400 compares (step 512) the number of memory portions 44(*a*), 48(*a*) that the OS modified to a predetermined threshold. In one embodiment, the FTC system 400 compares the number of memory portions 44(*a*), 48(*a*) that the OS has modified after the DMs 8 have transferred that memory portion 44(*a*), 48(*a*) but before the completion of the data move operation. If the number of modified memory portions 44(*a*), 48(*a*) is substantially greater than the predetermined threshold, the FTC system 400 repeats the previous steps (i.e., step 504 and step 508) until the modified memory portions 44(*a*), 48(*a*) are substantially less than the predetermined threshold. When the transferred memory portions 44(*a*), 48(*a*) are less than the predetermined threshold, the FTC system 400 halts (step 516) the OS and copies (step 520) the rest of the memory portions 44(*a*), 48(*a*). After the DMs 8 transfer the rest of the memory portions, the FTC system 400 restarts (step 524) the OS. As described in greater detail below, step 504 through step 512 are referred to as the brownout phase and step 516 through step 524 are referred to as the blackout phase.

Figure 6:
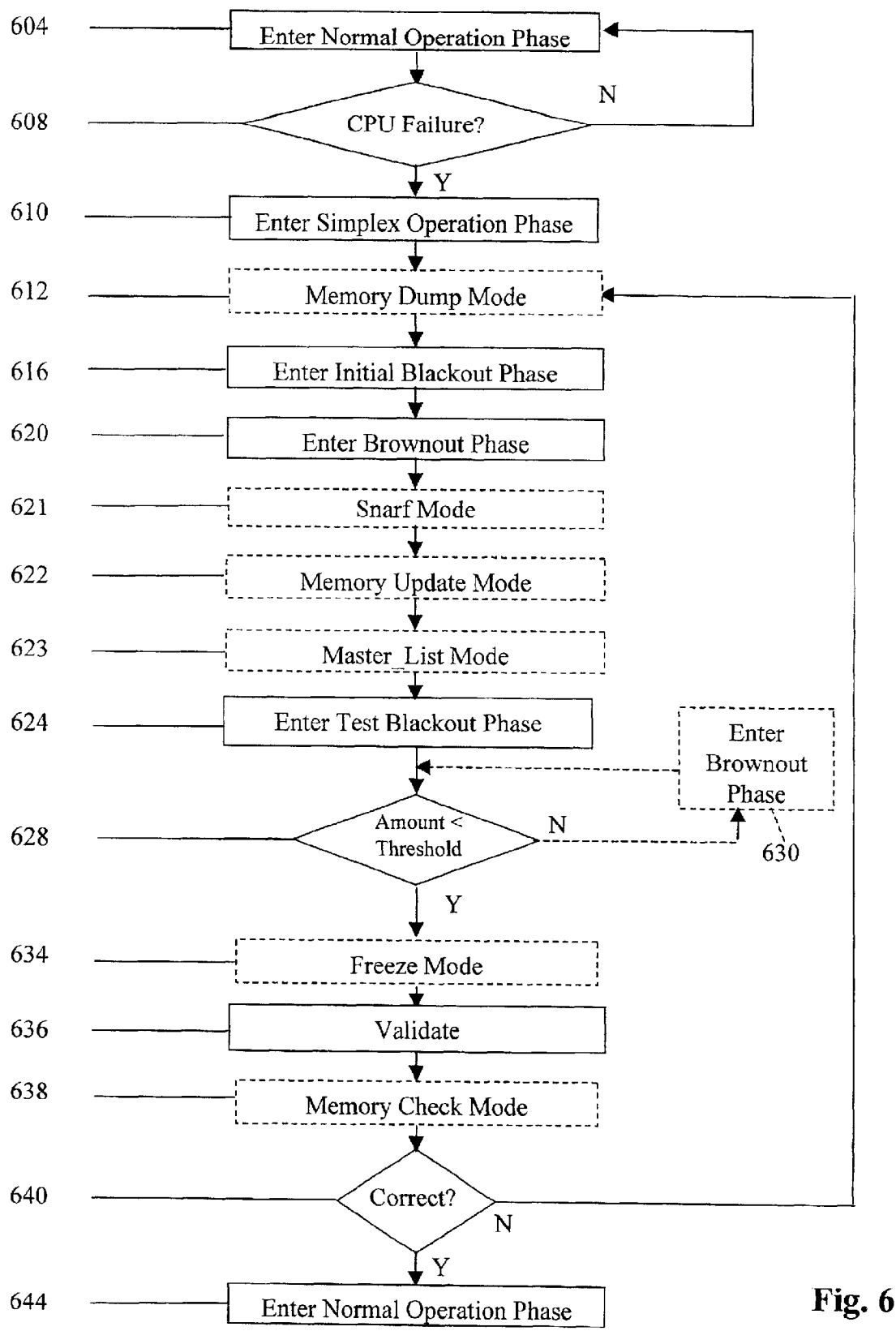
FIG. 6 is a flow chart illustrating embodiments of the steps performed by a fault-tolerant computer system in data move operation in accordance with the invention.

More specifically and also referring to FIG. 6, a more detailed flow diagram denoting embodiments of the steps of a data move is shown. When the CPUs 408 operate properly, the FTC system 400 performs (step 604) in a normal operation phase. In one embodiment, a voting mechanism determines (step 608) if a CPU 408 fails or is not functioning properly. If the second CPU 408(*b*) fails (or is not operating correctly), the FTC system 400 does not recognize the off-line CPU 408(*b*).

When the second CPU 408(*b*) does not function properly, the FTC system 400 enters (step 610) into a simplex operation phase (i.e., operating with one CPU 408). In one embodiment, the software (e.g., OS) configures the DM 8 to operate (shadow step 612) in a memory dump mode. When operating in the memory dump mode, the DM 8 transfers the data in the target memory block 12(*b*) of the off-line CPU 408(*b*) to the source, or on-line, memory block 12(*a*) of the on-line CPU 408(*a*). In one embodiment, the master DM 8(*a*) obtains a write address that corresponds to the destination address for the data move (i.e., the on-line memory block 12(*a*)). For example, the FTC system 400 configures the DM 8 to operate in the memory dump mode to transfer data from a memory block 12 of a broken CPU 408 (e.g., a CPU 408 that is not powered up) or a CPU 408 that is not functioning properly. More specifically, the DM 8 typically operates in the memory dump mode to determine the cause of a software crash through the examination of the memory block 12 of a broken CPU 408.

The FTC system 400 then enters (step 616) an initial blackout phase. The FTC system 400 prepares to copy memory from the online CPU motherboard 404(*a*) to the off-line CPU motherboard 404(*b*). In one embodiment, the FTC system 400 suspends user level processing.

Following the initial blackout phase, the FTC system 400 enters (step 620) a brownout phase. In this phase, the FTC system 400 copies the memory portions 44(*a*), 48(*a*) of the source memory block 12(*a*) of the on-line CPU 408(*a*) to the memory portions 44(*b*), 48(*b*) of the target memory block 12(*b*) of the off-line CPU 408(*b*). More specifically, in one embodiment the software configures the DMs 8 to operate in snarf mode (shadow step 621). The DM 8 executes in the snarf mode to determine when a peripheral device 460 writes data to the source memory block 12(*a*) of the on-line CPU 408(*a*). Because the peripheral device 460 cannot typically transmit memory writes to the target memory block 12(*b*) of the off-line CPU 408(*b*), the FTC system 400 executes the memory writes to the source memory block 12(*a*) of the on-line CPU 408(*a*) and the DM 8 (operating in snarf mode) copies these unperformed memory writes (with respect to the target memory block 12(*b*) of the off-line CPU 408(*b*)) to a separate location. In one embodiment, the separate location is a FIFO.

In one embodiment, the software then configures the DM 8 to operate in a memory update mode (shadow step 622). When operating in memory update mode, the DM 8 copies the entire source memory block 12(*a*) from the on-line CPU 408(*a*) to the target memory block 12(*b*) of the off-line CPU 408(*b*). As described above, in one embodiment the address corresponding to the source memory block 12(*a*) of the on-line CPU 408(*a*) is equivalent to the address of the target memory block 12(*b*) of the off-line CPU 408(*b*). When executing in the memory update mode (or any other mode), the DM 8 can simultaneously operate in a secondary mode. In one embodiment, the software configures the DM 8 to operate in the master_all mode to transmit sequential memory portions 44, 48. Alternatively, the software configures the DM 8 to operate in the master_list mode to transfer and/or check non-contiguous memory portions 44, 48.

In greater detail and when operating in the master_list mode, the DM 8 obtains the start address of a list of addresses corresponding to memory portions 44(*a*), 48(*a*) that the DMs 8 move, or a modified page entry (MPE). For instance, the start address 304 acts as a pointer to the MPE. In one embodiment, the master DM 8(*a*) reads eight 32-bit words from the start address of the MPE to obtain the addresses of eight memory portions 44, 48 that the DMs 8 will move. The master DM 8(*a*) then transmits the first value, or address (e.g., start address), in the MPE to the slave DMs 8(*b*) and the DMs 8 move their respective memory portions 44, 48. After determining that the slave DMs 8 have completed their respective data moves, the master DM 8(*a*) transmits the next value in the MPE as the next address. More specifically, an example of the MPE is illustrated below:

| Data Mover | MPE address |
|---|---|
| Entry is ignored | 0800 |
| *Stop Data Mover | 0900 |
| MPE | 0600 |
| **Generate interrupt | 1000 |
| MPE | 0400 |
| MPE | 0300 |

-continued

| Data Mover | MPE address |
|---|---|
| MPE | 0200 |
| Modified Page Entry | 0100 |

The table shown illustrates an example of the MPE including a predefined end address, denoted by *. In one embodiment, the predefined end address is substantially equivalent to 0900. The master DM 8(*a*) stops the data move when the address in the MPE is substantially equivalent to the predefined end value (e.g., 0900). In a further embodiment, the master DM 8(*a*) generates an interrupt when the address in the MPE is substantially equivalent to a predefined interrupt address (denoted by **) In one embodiment, the predefined interrupt address is substantially equivalent to 1000.

If a CPU 408 (or peripheral device 460) writes to the source memory block 12(*a*) while the DM 8 is copying the memory portions 44(*a*), 48(*a*) of the source memory block 12(*a*), the DM 8 (which is concurrently operating in snarf mode) copies the memory write commands to a posted memory write FIFO (PMWF). The DM 8 determines when these memory writes occur by reading the BBW, as described above in FIG. 2. Further, the software updates an independent data structure (i.e., the MPE) with information about which memory portion 44(*a*), 48(*a*) was modified. During the brownout phase, the on-line CPU 408(*a*) operates and additionally processes commands from the peripheral devices 460.

After the DM 8 copies the source memory block 12(*a*) and in addition to the mode that the DM 8 is currently operating in, the software configures the DM 8 to operate (shadow step 623) in master_list mode. The software configures the DM 8 to operate in master_list mode to enable the DM 8 to copy the memory portions that the on-line CPU 408(*a*) modified (i.e., dirty memory portions) during the copy of the entire source memory block 12(*a*) (i.e., configuring DM 8 to operate in master_list mode because copying non-contiguous memory portions 44, 48).

Following the copying of the memory portions 44(*a*), 48(*a*) of the source memory block 12(*a*), the FTC system 400 enters (step 624) a test blackout phase. In the test blackout phase, the software evaluates the source memory block 12(*a*) to determine (step 628) the amount of the dirty memory portions 44(*a*), 48(*a*) not copied by the DM 8. In a further embodiment, if the amount of dirty memory portions 44(*a*), 48(*a*) not copied is greater than a predetermined threshold, the FTC system 400 enters (step 630) additional brownout phases until the amount of dirty memory portions 44(*a*), 48(*a*) not copied is substantially less than or substantially equivalent to the predetermined threshold.

In one embodiment, the software uses a heuristic program to determine if a memory portion 44(*a*), 48(*a*) has been "dirtied" during several operations (i.e., entering additional brownout phases several times). In another embodiment, the software uses "insight" into the operating system to determine memory portions 44(*a*), 48(*a*) that are "dirtied" during several operations. For example, the software determines the address of frequently used databases.

In one embodiment, the FTC system 400 then operates (shadow step 634) in freeze mode to pause all I/O traffic. More specifically, the FTC system 400 does not accept any posted memory writes from a peripheral device 60 when the DM 8 operates in freeze mode. The software then copies or flushes the remaining states of the devices in the FTC system 400 (e.g., changes the state of the CPU 408(*b*) to an on-line state). When the DM 8 exits the snarf mode, the DM 8 clears the PMWF. The DM 8 then executes the memory writes that were stored in the PMWF before exiting the freeze mode (i.e., restarting the I/O traffic).

The FTC system 400 then synchronizes the execution of the CPUs 408 by validating (step 636) that the second (previously off-line) CPU 408(*b*) is operating in lock-step with the first CPU 408(*a*). In one embodiment, the software configures the DM 8 to operate (shadow step 638) in memory check mode to verify that the source memory block 12(*a*) of the previously on-line CPU 408(*a*) is substantially equivalent to the target memory block 12(*b*) of the previously off-line CPU 408(*b*). In another embodiment, the DM 8 operating in the memory check mode determines if the source memory block 12(*a*) of the on-line CPU 408(*a*) is correct (i.e., verifies that the data in the source memory block 12(*a*) is substantially equivalent to predetermined data). When these checks are successful (step 640), the FTC system 400 is considered to be repaired and the target memory block 12(*b*) is substantially equivalent to the source memory block 12(*a*). The FTC system 400 consequently returns (step 644) to normal operation. If the checks are unsuccessful, the FTC system 400 again configures the DM 8 to operate (shadow step 612) in memory dump mode, as described above.

Although the configuration of the modes of the DMs 8 were described above with respect to a memory block, the software can configure the mode (i.e., memory update mode, memory dump mode, snarf mode, freeze mode, memory check mode, master_list mode, and master_all mode) of the DM 8 at any time.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. In a computer system, a method for transferring portions of a memory block comprising the steps of:
    (a) providing a first data mover with a first start address corresponding to a first portion of a source memory block;
    (b) providing a second data mover with a second start address corresponding to a second portion of the source memory;
    (c) generating a boundary window to ensure that the first and second memory portions are available for transfer,
    (d) verifying that the first portion and the second portion of the source memory block are available for transfer by checking the boundary window before transferring each of the first memory portion and the second memory portion;
    (e) after verification, transferring, by the first data mover, the first portion of the source memory block; and
    (f) after verification transferring, by the second data mover, the second portion of the source memory block.

2. The method of claim 1 wherein the computer system is a fault-tolerant computer system (FTC) further comprising at least two central processing units.

3. The method of claim 2 wherein one central processing unit is maintained in an on-line state and the other central processing unit is maintained in an off-line state.

4. The method of claim 1 wherein at least one data mover stops transferring all memory blocks in response to a system event.

5. The method of claim 4 further comprising configuring the first data mover with a first chunk end address corresponding to the first portion of the source memory block.

6. The method of claim 5 wherein the system event occurs when the first start address is equivalent to the first chunk end address.

7. The method of claim 5 further comprising configuring the second data mover with a second chunk end address.

8. The method of claim 7 further comprising generating the second chunk end address.

9. The method of claim 7 further comprising configuring the second data mover with a second write address corresponding to a second portion of a second target memory block.

10. The method of claim 7 wherein the system event occurs when the second start address is equivalent to the second chunk end address.

11. The method of claim 7 wherein the system event occurs when the second start address is equivalent to a predefined end address.

12. The method of claim 1 further comprising configuring the first data mover as a master data mover and the second data mover as a slave data mover.

13. The method of claim 12 further comprising communicating, by the master data mover, the first start addresses to the slave data mover.

14. The method of claim 4 further comprising the step of performing a memory update using the off-line central processing unit.

15. The method of claim 4, wherein the system event is a power failure.

16. The method of claim 1 further comprising simultaneously transferring the first portion and the second portion of the source memory block.

17. In a computer system, a method for transferring portions of a memory block comprising the steps of:
   (a) designating a master data mover;
   (b) designating a slave data mover in communication with the master data mover;
   (c) transmitting a start address to the master data mover, the start address identifying a first memory ortion of a source memory block;
   (d) transmitting the start address to the slave data mover to enable the slave data mover to determine a next ddress, the next address identifying a second memory portion of the source memory block;
   (e) checking a boundary window to ensure that the first and second memory portions are available for transfer;
   (f) transmitting a first write address identifying a first memory portion of a target memory block to the master data mover and a second write address identifying a second memory portion sized differently than the first memory portion of the target memory block to the slave data mover;
   (g) after verification, transferring the first memory portion of the source memory block to the first write address identifying the first memory portion of the target memory block; and
   (h) after verification, transferring the second memory portion of the source memory block to the second write address identifying the second memory portion of the target memory block.

18. A system to transfer portions of a memory block comprising:
   (a) a first data mover;
   (b) a second data mover in communication with the first data mover over a DM communication bus;
   (c) a first memory component having a first portion and a second portion sized differently from the first portion and in communication with the first data mover and the second data mover over a first DM-memory bus; and
   (d) a second memory component in communication with the first data mover and the second data mover over a second DM-memory bus;
   (e) a boundary window to ensure that the first and second memory components are available for transfer,
   wherein the first data mover and the second data mover check the boundary window before transferring at least one of the first memory portion and the second memory portion;
   wherein the first data mover transfers the first memory portion to the second memory component over the first DM-memory bus at a first data transfer rate after checking the boundary window, and
   wherein the second data mover transfers the second memory portion to the second memory component over the second DM-memory bus at a second data transfer rate after checking the boundary window.

19. The system of claim 18 wherein the first DM-memory bus is a Peripheral Component Interconnect (PCI) bus and the second DM-memory bus is an Accelerated Graphics Port (AGP) bus.

20. The system of claim 18 wherein the first data mover transfers the first memory portion at a simultaneous time as the second data mover transfers the second memory portion.

21. The system of claim 18 wherein the first data mover is a first Direct Memory Access (DMA) engine and the second data mover is a second DMA engine.

22. The system of claim 18 wherein the system is incorporated in a fault-tolerant computer (FTC) system.

23. The system of claim 18 wherein the fault tolerant system includes and an on-line central processing unit (CPU) and off-line central processing unit (CPU).

24. The system of claim 18 wherein at least one data mover stops transferring all memory blocks in response to a system event.

25. The system of claim 18 wherein the system event is a power failure.

26. The system of claim 18 wherein the system event is a brown out.

27. The system of claim 18 wherein the off-line processor is adapted for receiving memory updates.

* * * * *